UNITED STATES PATENT OFFICE.

GIACOMO BOTTARO, OF GENOA, ITALY.

PROCESS OF SEPARATION OF FATTY AND OLEOUS MATERIALS FROM WATERY EMULSIONS AND FINELY-SUBDIVIDED SOLID MATERIALS INSOLUBLE IN WATER.

1,159,355.        Specification of Letters Patent.        Patented Nov. 9, 1915.

No Drawing.        Application filed November 12, 1914. Serial No. 871,338.

*To all whom it may concern:*

Be it known that I, GIACOMO BOTTARO, a subject of the King of Italy, residing at Genoa, Italy (whose post-office address is Via Vincenzo Ricci 3–6, Genoa, Italy), have invented a new and useful improved process of separation of fatty and oleous materials from watery emulsions and finely-subdivided solid materials insoluble in water, of which the following is a specification.

It is known that it is rather difficult to separate, by known methods, the finely subdivided solid materials and fatty or oleous bodies from emulsions with watery liquids. As this is now generally done by filtering, the solid materials remain on the filter saturated with oleous or fatty substances and watery liquid, thus often entailing a heavy loss of both these materials. The separation, though this be not always possible, is also obtained sometimes by extraction with a solvent which by extracting the oleous or fatty substance breaks up the emulsion and permits of also recovering the watery liquid from which the insoluble solid body is precipitated. By the said second process, in the cases in which it is possible to use it, losses are avoided, but the method is a very costly and lengthy one. There is, however, a means which is always reliable whenever its use is permitted by the chemical properties of the solid body which keeps the emulsion between the oleous or fatty substance and the watery liquid. This means, which forms the subject matter of my present invention, consists in rendering soluble the insoluble material, thus breaking up the emulsion.

Supposing the finely subdivided material insoluble in water consists entirely or partly of calcium carbonate or a carbonate of another alkaline earth metal the bicarbonate or acid salt of which is soluble in water, I simply convert the said carbonate of the alkaline earth metal into the corresponding soluble bicarbonate by the action of carbonic anhydrid and such quantity of water that all of the bicarbonate formed may be dissolved, in order to break up the emulsion and separate by decanting, without any loss, the oleous or fatty substance floating on the solution formed. Furthermore the watery liquid,—if it contains valuable substances,—may be recovered by so heating it that the carbonic anhydrid escapes from the bicarbonate of the alkaline earth metal dissolved so that insoluble carbonate is again formed and precipitated, from which all of the watery liquid may be separated without any loss by decanting.

Another case in which the same method for breaking up the emulsion and recovering the ingredients without losses may be used is that of a sulfite of an earth alkaline metal entirely or partly forming the finely subdivided insoluble body, with the difference, however, that instead of carbonic anhydrid sulfurous anhydrid is used, and then proceeding for the remainder exactly as has been described for carbonic anhydrid. By way of example a mixture of 60 parts of oleous or fatty substances (such as oil, tallow, fatty acid of oil or tallow, mineral oil, fats generally, and so forth), and 25 parts of water, 5 parts of any mineral or organic substance soluble in water (such as nickel chlorid, glycerin, and so forth) and 10 parts of calcium carbonate may be used. To this mixture a slightly larger than the theoretically needed quantity of carbonic anhydrid (in my present case from 5 to 6 parts and, if necessary, in a closed vessel under pressure) and such quantity of water are added as to obtain a limpid solution of bicarbonate. When left at rest for a little time, the 60 parts of oleous or fatty substances rise to the surface and are removed with a ladle or, in case of a closed vessel, through a cock placed above the watery solution. Then by heating the solution carbonic anhydrid is evolved which causes the carbonate of alkaline earth metal to be precipitated, the watery solution is separated by decanting or a suitable cock. By causing the watery solution to evaporate the substance in solution (for instance nickel chlorid, glycerin or such like) may be recovered.

When using the same materials but with 10 kilograms of calcium sulfite instead of carbonate in the solution, it is sufficient to add from 6 to 7 kilograms of sulfurous anhydrid for obtaining soluble bisulfite, and then proceeding exactly as described for carbonate, the oleous or fatty substance is first separated from the insoluble sulfite, and thereupon, the watery liquid. If it is possible to use the second method, this will be more convenient for the reason that disulfites of alkaline earth metals generally are more soluble than bicarbonates and therefore a smaller quantity of water is needed for dissolving them. Another acid, for instance hydrochloric acid cannot be used because the chlorids of earth alkaline metals being soluble would permit of recovering the oleus or fatty substance, but as the said soluble chlorids would remain in the watery solution and could not be precipitated, it would be impossible to recover the other valuable substances which are also dissolved in the said watery liquid (such as nickel chlorid, glycerin and so forth).

Having now particularly described and ascertained the nature of my said invention, and in what manner the same is to be performed, I declare that what I claim is:

1. The herein described process for the separation of fatty and oleous substances from an emulsion with watery liquid and a finely subdivided solid substance which is insoluble in water, in which emulsion the said solid substance is a neutral salt of an alkaline earth metal, consisting in converting the said insoluble salt into a soluble salt to separate it from the oleous and fatty substances, and then separating the last mentioned substances from the watery liquid.

2. The herein described process for the separation of fatty and oleous substances from an emulsion with water liquid and a finely subdivided solid substance which is insoluble in water, in which emulsion the said solid substance is a neutral salt of an alkaline earth metal, consisting in converting the said insoluble salt into a soluble salt to separate it from the oleous and fatty substances, then separating the last mentioned substances from the watery liquid, and then reconverting said soluble salt into the insoluble salt to precipitate the same and separate it from the watery liquid.

In testimony whereof I have signed my name to this specification in presence of two subscribing witnesses.

GIACOMO BOTTARO.

Witnesses:
 BASPO GABRELL,
 GINO PALH.